United States Patent
Betzen et al.

(10) Patent No.: US 10,336,183 B2
(45) Date of Patent: Jul. 2, 2019

(54) FUEL DOOR ARRANGEMENT FOR A MOTOR VEHICLE

(71) Applicant: GM GLOBAL TECHNOLOGY OPERATIONS LLC, Detroit, MI (US)

(72) Inventors: Heiko Betzen, Bausendorf (DE); Markus Frommann, Bingen am Rhein (DE); Klaus Gerst, Nauheim (DE); Philipp Huse, Frankfurt (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 7 days.

(21) Appl. No.: 15/827,118

(22) Filed: Nov. 30, 2017

(65) Prior Publication Data

US 2018/0154768 A1 Jun. 7, 2018

(30) Foreign Application Priority Data

Dec. 1, 2016 (DE) .......................... 10 2016 014 321

(51) Int. Cl.
*B60K 15/05* (2006.01)

(52) U.S. Cl.
CPC ........ B60K 15/05 (2013.01); *B60K 2015/053* (2013.01); *E05Y 2900/534* (2013.01)

(58) Field of Classification Search
CPC .............. B60K 15/05; B60K 2015/053; B60K 2015/0523; B60K 2015/0515; B60K 2015/0538; E05Y 2900/534
USPC ...................................................... 296/97.22
See application file for complete search history.

(56) References Cited

U.S. PATENT DOCUMENTS

| 5,533,766 | A | * | 7/1996 | Farber | B60K 15/05 292/144 |
| 7,753,431 | B2 | * | 7/2010 | Yamamoto | B60K 15/0406 220/DIG. 33 |
| 2005/0280276 | A1 | * | 12/2005 | McComsey | B60K 15/05 296/97.22 |
| 2011/0285166 | A1 | * | 11/2011 | Baba | E05D 3/145 296/97.22 |
| 2015/0224872 | A1 | * | 8/2015 | Frommann | B60K 15/05 296/97.22 |
| 2015/0375630 | A1 | * | 12/2015 | Jeong | B60K 15/05 49/386 |
| 2016/0016464 | A1 | * | 1/2016 | Betzen | B60K 15/05 296/97.22 |
| 2017/0368928 | A1 | * | 12/2017 | Mori | B60K 15/04 |
| 2018/0154768 | A1 | * | 6/2018 | Betzen | B60K 15/05 |
| 2018/0170176 | A1 | * | 6/2018 | Yang | B60K 15/05 |

FOREIGN PATENT DOCUMENTS

DE 10338820 A1 3/2005

* cited by examiner

*Primary Examiner* — Gregory A Blankenship
(74) *Attorney, Agent, or Firm* — Lorenz & Kopf, LLP

(57) ABSTRACT

A fuel door arrangement for a motor vehicle includes a filler neck compartment, a fuel door and a pivot arm carrying the fuel door. The pivot arm is coupled to the filler neck compartment and can be pivoted between a closed position and an open position about a pivoting axis. The fuel door can be radially displaced on the pivot arm relative to the pivoting axis. The fuel door at least sectionally closes the filler neck compartment in a closed position. The filler neck compartment is sufficiently revealed for refueling the motor vehicle when the fuel door is in an open position.

16 Claims, 2 Drawing Sheets

FUEL DOOR ARRANGEMENT FOR A MOTOR VEHICLE

CROSS-REFERENCE TO RELATED APPLICATION

This application claims priority to German Patent Application No. 102016014321.5, filed Dec. 1, 2016, which is incorporated herein by reference in its entirety.

TECHNICAL FIELD

This application pertains to a fuel door arrangement for a motor vehicle with a filler neck compartment, a fuel door and a pivot arm carrying the fuel door.

BACKGROUND

DE 103 38 820 A1 described a fuel door arrangement attached to a filler neck compartment. A pivot arm is pivotally coupled at a pivoting axis to the filler neck compartment such that the fuel door may pivot between a closed position, in which the fuel door at least sectionally closes the filler neck compartment, and an open position, in which the filler neck compartment is sufficiently opened for refueling the motor vehicle.

When the fuel door arrangement is installed in a vehicle, the fuel door should generally be arranged flush with a car body shell surrounding the fuel door arrangement in the closed position. If the pivoting axis would extend behind the fuel door in a top view of the car body shell, a section of the fuel door would penetrate into the filler neck compartment when the fuel door is opened. This requires a large filler neck compartment, but a suitable installation space for such a large filler neck compartment is difficult to find on the car body. As a result, the pivoting axis in the known fuel door arrangement is laterally offset relative to the fuel door and connected to the fuel door with a curved pivot arm. Although a compact fuel door can thereby be realized, at least the width of the filler neck compartment measured transverse to the pivoting axis is significantly larger than that of the fuel door due to the offset of the pivoting axis such that the problem of finding a suitable installation space persists.

SUMMARY

The present disclosure is directed to a fuel door arrangement for a motor vehicle with a filler neck compartment, a fuel door and a pivot arm carrying the fuel door, in which said pivot arm is coupled to the filler neck compartment and can be pivoted about a pivoting axis between a closed position, in which the fuel door at least sectionally closes the filler neck compartment, and an open position, in which the filler neck compartment is sufficiently opened for refueling the motor vehicle. The fuel door can be radially displaced on the pivot arm relative to the pivoting axis. Such a displacement of the fuel door makes it possible to prevent the fuel door from penetrating into the filler neck compartment in the open position. Consequently, the filler neck compartment also does not have to be dimensioned sufficiently large for accommodating a penetrating section of the fuel door. The displacement of the fuel door particularly makes it possible to prevent the fuel door from penetrating into the filler neck compartment in its open position when the pivoting axis is positioned in such a way that it overlaps with the fuel door in a top view of the fuel door in its closed position. The filler neck compartment therefore does not have to laterally extend beyond the fuel door as it is the case in the known fuel door arrangement. Consequently, the width of the filler neck compartment measured transverse to the pivoting axis may be kept small.

The fuel door should be pivotable by at least 75°, and preferably by at least 90°, between the open position and the closed position.

The displacement of the fuel door may be realized manually when it is opened and closed. However, the displacement of the fuel door on the pivoting arm may be coupled to the pivoting motion, particularly in such a way that the fuel door is in the open position arranged farther from the pivoting axis than in the closed position or in a position, which the fuel door temporarily assumes on its way from the closed position into the open position.

The displacement should be configured such that the pivoting axis is laterally offset relative to the fuel door in a top view of the fuel door in its open position.

In order to guide the displacement, tongues may be formed on opposite longitudinal edges of the pivot arm and engage into facing grooves of the fuel door.

Elongated ribs, between which the pivot arm engages, may be formed in the direction of displacement on the inner side of the fuel door. The aforementioned grooves may be formed on the flanks of these ribs that face the pivot arm.

In order to couple the displacement of the fuel door to the pivoting motion of the pivot arm, the filler neck compartment may feature a surface extending concentric to the pivoting axis. A wheel mounted on the pivot arm rolls on said concentric surface.

According to an embodiment, an eccentric mechanism is provided for coupling the wheel of the pivot arm to the fuel door. In order to accommodate such an eccentric mechanism in a space-saving fashion, its movable parts preferably should move only in directions extending parallel to the surface of the fuel door. In order to drive such motions, the wheel is preferably rotatable about an axis that intersects the pivoting axis.

According to another embodiment, the pivot arm may carry an additional wheel that rolls on the surface of the fuel door. In order to drive the displacement in the correct direction, the two wheels may in the simplest case be in direct contact with one another. The wheels and the surface of the fuel door may be frictionally connected to one another. Alternately, the surface and the wheels may respectively carry gears that ensure a positive connection in order to prevent any slip between the cooperating surfaces of the fuel door and the wheels.

The wheels may be rotatable about axes extending parallel to the pivoting axis.

The wheels may in particular include gearwheels or frictional wheels.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
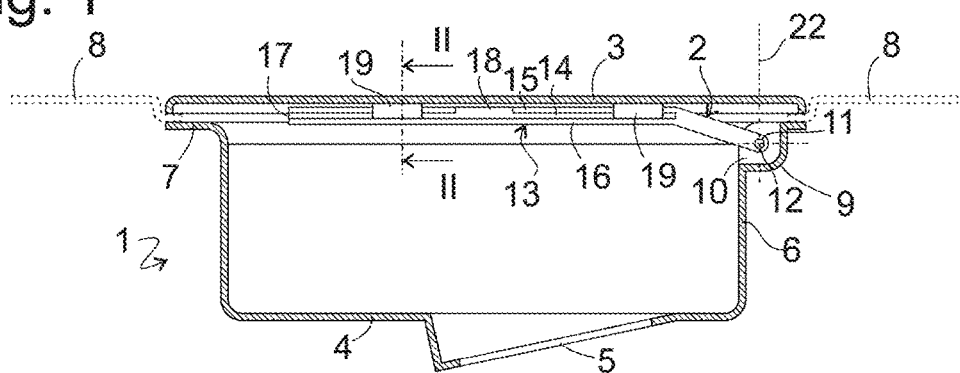
FIG. 1 shows a schematic section through a fuel door arrangement in the closed position.

FIG. 1 shows a section through a fuel door arrangement according to an embodiment of the present disclosure. The fuel door arrangement includes a filler neck compartment 1, a pivot arm 2 and a fuel door 3. The filler neck compartment 1 has the shape of a bowl or a cup with an open upper side that is covered by the fuel door 3, a bottom 4 with an opening 5 for a filler neck arranged therein, a wall 6 extending around the circumference of the bottom 4 and a flange 7 formed along an upper edge of the wall 6. The flange 7 is mounted such that it rests against the car body shell 8 when the fuel door arrangement is installed in a vehicle.

A bulge 9 is formed between the wall 6 and the flange 7 along a section of the circumference of the filler neck compartment 1. The bulge 9 has two wall sections 10, which are oriented perpendicular to the flange 7 and to the wall 6—in other words parallel to the plane of section of FIG. 1—and in which a shaft 11 oriented perpendicular to the plane of section of FIG. 1 is mounted. The shaft 11 defines a pivoting axis 12, about which the pivot arm 2 can be pivoted relative to the fuel neck compartment 1.

Figure 2:
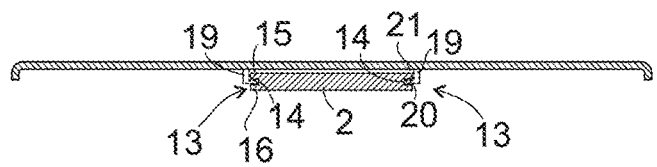
FIG. 2 shows a section through the fuel door and the pivot arm along II-II shown in FIG. 1.

Only one longitudinal edge 13 of the pivot arm 2 is visible in FIG. 1. According to the section in FIG. 2, a groove 14, which centrally extends along the longitudinal edge 13, divides the longitudinal edge 13 into upper and lower tongues 15 and 16 that respectively face the fuel door 3 and the bottom 4. Grooves 14 are provided on both longitudinal edges 13 of the pivot arm 2 as shown in FIG. 2. In this case, the grooves 14 are respectively open on one end 17 of the pivot arm 2 (see FIG. 1). Gaps 18 may be additionally or alternatively provided in the upper tongue 15.

Ribs 19 extending to both sides of the longitudinal edges 13 of the pivot arm 2 are formed on the inner side of the fuel door 3. Tongues 20 originating from facing flanks of the ribs 19 engage into the grooves 14 of the pivot arm 2 and thereby define the grooves 21, into which the upper tongues 15 of the pivot arm 2 engage, together with the inner side of the fuel door 3 such that the fuel door 3 is displaceably guided on the pivot arm 2 along the longitudinal edges 13 due to the tongue-and-groove engagement.

In this case, the tongues 20 are narrower than the gaps 18 in the longitudinal direction of the pivot arm 2 such that the connection between the pivot arm 2 and the fuel door 3 can be separated by placing the tongues 20 into the gaps 18 or by pushing said tongues out of the grooves 14 through the open ends 17 and subsequently lifting the fuel door 3 off the pivot arm 2. Although the ribs 19 in FIG. 1 respectively have the same extent as the tongues 20 in the longitudinal direction of the pivot arm 2, they may also be longer than said tongues and, e.g., merged into a single rib that completely covers a narrow side 13.

Since the pivoting axis 12 overlaps with the fuel door 3 in a top view of the fuel door 3 in a direction extending perpendicular to its exposed principle surface on the car body surface, e.g. along the line 22 (see FIG. 1), the fuel door 3 moves away from the filler neck compartment 1 on one side of the line 22, but simultaneously moves toward the filler neck compartment on the other side of the line 22, when the fuel door 3 is pivoted about the pivoting axis 12.

Figure 3:
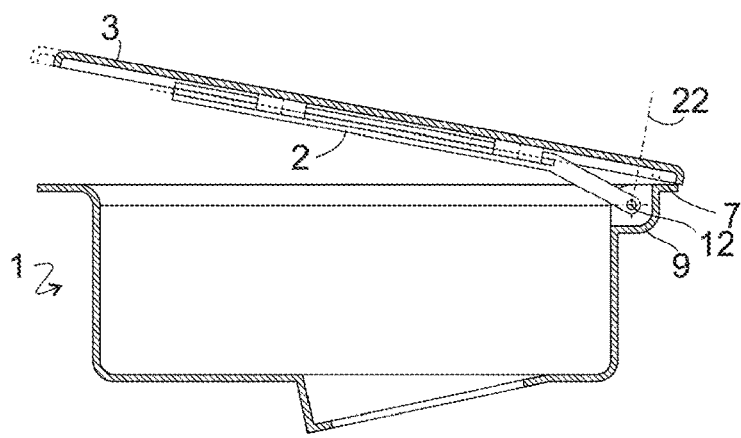
FIG. 3 shows the fuel door arrangement in a partially open position.

FIG. 3 shows the fuel door 3 in a partially open position. Without a motion of the fuel door 3 along the pivot arm 2, an edge of the fuel door 3 would collide with the flange 7 beyond the bulge 9 in the position shown. In order to additionally open the fuel door 3, it has to be displaced along the pivot arm 2 toward its end that faces away from the pivoting axis 12, e.g. into the position drawn with broken lines in FIG. 3.

In the closed position, as well as in the partially open position illustrated in FIG. 3, the shortest linear connection between any points of the pivoting axis 12 and the fuel door 3 extends along the surface normal 22 of the fuel door 3, which intersects the pivoting axis 12, such that the distance between the pivoting axis 12 and the fuel door 3 has not yet changed from the closed position according to FIG. 2. The distance between the pivoting axis 12 and the fuel door 3 only begins to increase once the fuel door 3 is additionally pivoted beyond the position illustrated in FIG. 3 to such a degree that the fuel door 3 and the pivoting axis 12 no longer overlap viewed from the direction of the surface normal 22, i.e. once the shortest connection between the fuel door 3 and the pivoting axis 12 begins to deviate from the surface normal 22.

Figure 4:
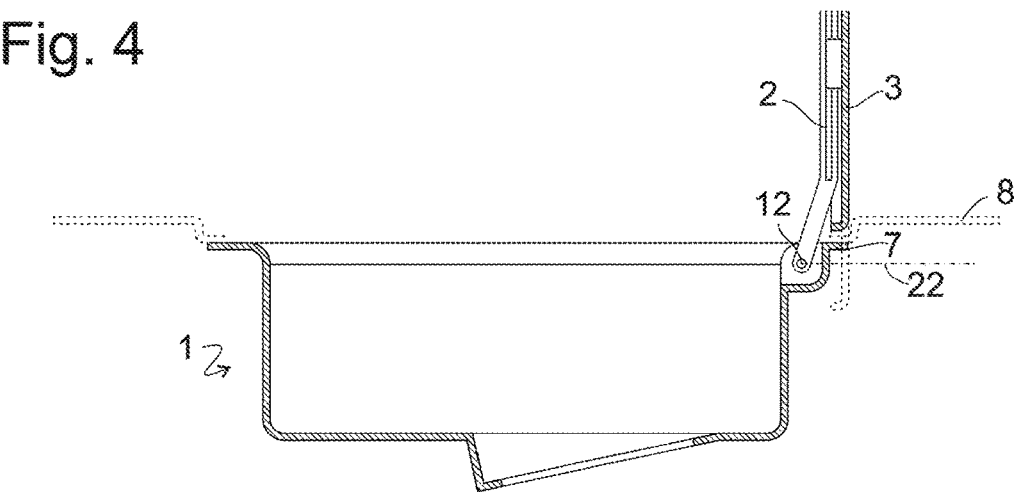
FIG. 4 shows the fuel door arrangement in a fully open position.

FIG. 4 shows the fuel door 3 in a completely open position. The fuel door 3 has moved forward on the pivot arm 2 to such an extent that the fuel door 3 and the pivoting axis 12 no longer overlap viewed from the direction of the surface normal 22 (being pivoted with the fuel door 3). The pivoting axis 12 is located within the car body shell 8 and the fuel door 3 is located completely outside the car body shell. In comparison, the contour drawn with broken lines shows the position, which the fuel door 3 would have to have reached without a displacement along the pivot arm 2; the movement into this position is obviously blocked by the flange 7 and the car body shell 8.

Figure 5:
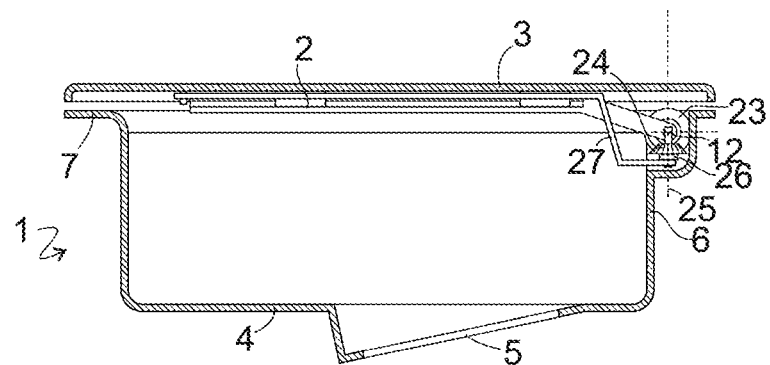
FIG. 5 shows a section analogous to FIG. 1 through a fuel door arrangement with a coupling mechanism according to an embodiment.

FIG. 5 shows a section analogous to FIG. 1 through a fuel door arrangement according to the first enhanced embodiment of the present disclosure. The fuel door 3 can be displaced along the pivot arm 2 as shown in FIGS. 1-4 when it is opened in the closed. A mechanism for coupling the pivoting motion of the pivot arm 2 with the displacement of the fuel door 3 includes a bevel gear or a bevel gear sector 23 that is rigidly arranged on the filler neck compartment 1 concentric to the pivoting axis 12, a bevel gear 24, the rotational axis 25 of which is rigidly connected to the pivot arm 2 and intersects the pivoting axis 12, an eccentric arm 26 that is connected to the bevel gear 24 in a rotationally rigid fashion and a control arm 27 that is coupled to the eccentric arm 26 on one end 28 and to the fuel door 3 on the other end 29.

Figure 6:
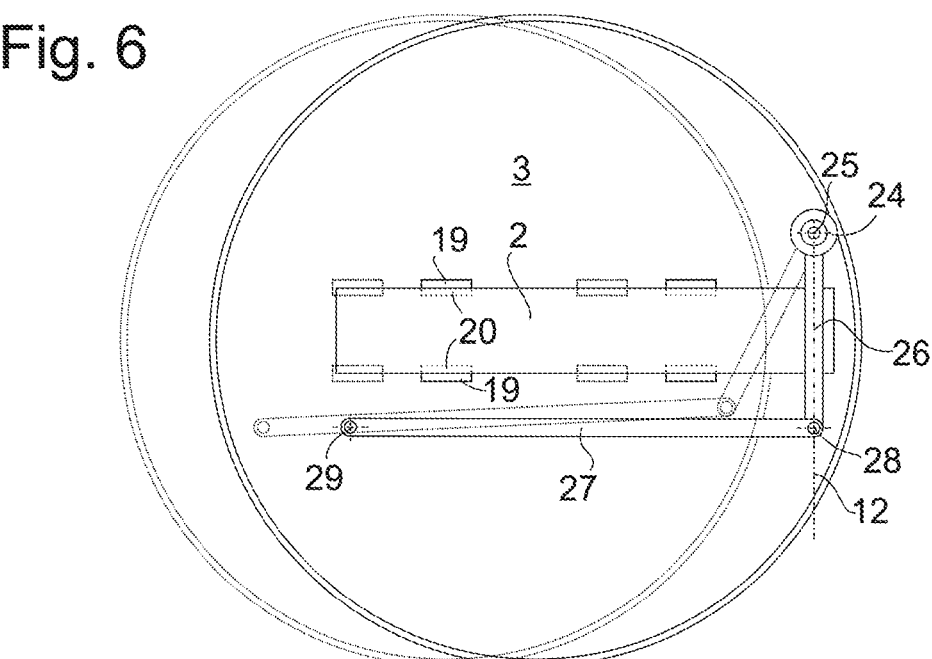
FIG. 6 shows a top view of the coupling mechanism according to FIG. 5.

When the fuel door 3 is pivoted from the position according to FIG. 5 into the open position, the bevel gear 24 moves along the bevel gear sector 23 in the clockwise direction and is thereby set in rotation about the axis 25; the resulting motions of the control arm 27 and the fuel door 3 can be gathered from FIG. 6.

FIG. 6 schematically shows the inner side of the fuel door 3 and the pivot arm 2 viewed from a direction extending parallel to the rotational axis 25. When the fuel door 3 is closed, the eccentric arm 26 is oriented—in this case parallel to the pivoting axis 12—in such a way that the eccentric arm 12 and the control arm 27 on its end 28 define an approximately right angle or a slightly acute angle. The bevel gear 24 is set in rotation when the fuel door 3 is opened and thereby pivots the eccentric arm 26 in the clockwise direction in FIG. 6 such that the angle between the eccentric arm 26 and the control arm 27 increases—in this case beyond 90°—and the control arm 27 pushes the fuel door 3 away from the pivoting axis 12 until it has reached the position relative to the pivoting arm 2, which is drawn with broken lines in FIG. 6, in the open position.

Figure 7:
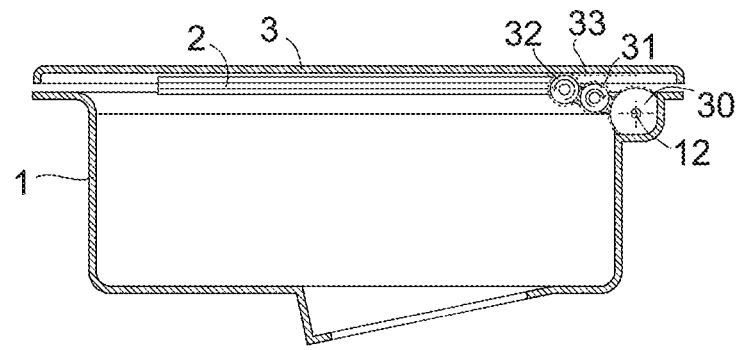
FIG. 7 shows a section analogous to FIGS. 1 and 5 through a fuel door arrangement with a coupling mechanism according to another embodiment.

FIG. 7 shows a section through a closed fuel door arrangement according to a second enhanced embodiment. In this case, a mechanism for coupling the displacement of the fuel door 3 along the pivot arm 2 with the pivoting motion of the pivot arm 2 includes a fixed gearwheel or gearwheel sector on the filler neck compartment 1, a first gearwheel 31 that is mounted on the pivot arm 2 and meshes with the gearwheel sector 30 and a second gearwheel 32 that is mounted on the pivot arm 2 and meshes with the gearwheel 31 and a rack 33 on the fuel door 3. The axes of the gearwheels 31, 32 extend parallel to the pivoting axis 12. Due to the engagement with the gearwheel sector 30, the gearwheel 31 is set in rotation in the clockwise direction (referred to the perspective in FIG. 7) when the fuel door 3 is opened; the gearwheel 32 accordingly rotates in the counterclockwise direction and thereby pushes the fuel door 3 away from the pivoting axis 12. The magnitude of the displacement of the fuel door 3 can be arbitrarily adjusted with a suitable selection of the diameters of the gearwheels 31, 32.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A fuel door arrangement for a motor vehicle comprising:
    a filler neck compartment;
    a fuel door; and
    a pivot arm supporting the fuel door and pivotally coupled to the filler neck compartment such that the fuel door is positionable about a pivoting axis between a closed position for at least sectionally closing the filler neck compartment, and an open position for revealing the filler neck compartment to enable refueling of the motor vehicle;
    wherein the fuel door is displaceably supported on the pivot arm for relative radial movement with respect to the pivoting axis.

2. The fuel door arrangement according to claim 1, wherein the pivoting axis overlaps with the fuel door in a top view of the fuel door in its closed position.

3. The fuel door arrangement according to claim 1, wherein the fuel door is pivotable by at least 75° between the open position and the closed position.

4. The fuel door arrangement according to claim 1, further comprising a coupler operably connected between the fuel door and the pivot arm and configured to radially displace the fuel door through the pivoting motion of the pivot arm.

5. The fuel door arrangement according to claim 4, wherein the fuel door is arranged farther from the pivoting axis in the open position than in the closed position.

6. The fuel door arrangement according to claim 4, is arranged farther from the pivoting axis in an intermediate position, which the fuel door temporarily assumes on its way from the closed position into the open position, than in the closed position.

7. The fuel door arrangement according to claim 1, wherein the pivoting axis is laterally offset relative to the fuel door in a top view of the fuel door in its open position.

8. The fuel door arrangement according to claim 1, further comprising tongues formed on opposite longitudinal edges of the pivot arm which engage facing grooves formed on the fuel door.

9. The fuel door arrangement according to claim 1, further comprising elongated ribs formed in the direction of displacement on the inner side of the fuel door, wherein the pivot arm is engaged between the elongated ribs.

10. The fuel door arrangement according to claim 1, further comprising a first wheel mounted on the pivot arm and configured to roll on a surface formed in the filler neck compartment and extending concentric to the pivoting axis.

11. The fuel door arrangement according to claim 10, wherein the first wheel of the pivot arm is coupled to the fuel door by an eccentric mechanism.

12. The fuel door arrangement according to claim 11, wherein the first wheel is rotatable about an axis that intersects the pivoting axis.

13. The fuel door arrangement according to claim 10, wherein the pivot arm carries a second wheel that rolls on a surface of the fuel door.

14. The fuel door arrangement according to claim 13, wherein the first and second wheels are rotatable about axes that extend parallel to the pivoting axis.

15. The fuel door arrangement according claim 10, wherein the surface extending concentric to the pivoting axis and the first wheel comprise cooperating gears or frictional surfaces.

16. The fuel door arrangement according claim 10, wherein the surface extending concentric to the pivoting axis and the first wheel comprise frictional surfaces.

* * * * *